(12) United States Patent
Hansson et al.

(10) Patent No.: US 10,631,468 B2
(45) Date of Patent: Apr. 28, 2020

(54) BLADE ARRANGEMENT FOR HAND-HELD POWER TOOL AND CLAMPING MEMBER

(71) Applicant: HUSQVARNA AB, Huskvarna (SE)

(72) Inventors: Anders Hansson, Huskvarna (SE); Joakim Persson, Skillingaryd (SE)

(73) Assignee: Husqvarna AB, Huskvarna (SE)

( * ) Notice: Subject to any disclaimer, the term of this patent is extended or adjusted under 35 U.S.C. 154(b) by 43 days.

(21) Appl. No.: 15/780,002

(22) PCT Filed: Nov. 30, 2015

(86) PCT No.: PCT/EP2015/078027
§ 371 (c)(1),
(2) Date: May 30, 2018

(87) PCT Pub. No.: WO2017/092781
PCT Pub. Date: Jun. 8, 2017

(65) Prior Publication Data
US 2018/0359929 A1 Dec. 20, 2018

(51) Int. Cl.
*A01G 3/053* (2006.01)
*A01D 34/33* (2006.01)
*A01G 3/04* (2006.01)

(52) U.S. Cl.
CPC .............. *A01G 3/053* (2013.01); *A01D 34/33* (2013.01); *A01G 2003/0461* (2013.01)

(58) Field of Classification Search
CPC . A01G 3/053; A01G 2003/0461; A01D 34/33
USPC ......................................... 30/221, 223, 225
See application file for complete search history.

(56) References Cited

U.S. PATENT DOCUMENTS

| | | | | |
|---|---|---|---|---|
| 4,798,001 A | * | 1/1989 | Grossmann | B23D 49/006 30/355 |
| 5,373,641 A | * | 12/1994 | Ohkanda | A01G 3/053 30/216 |
| 5,473,820 A | * | 12/1995 | Neubert | B23D 49/006 30/369 |

(Continued)

FOREIGN PATENT DOCUMENTS

| | | |
|---|---|---|
| CN | 204217534 U | 3/2015 |
| EP | 2294907 B1 | 11/2012 |

(Continued)

OTHER PUBLICATIONS

International Search Report and Written Opinion for International Application No. PCT/EP2015/078027 dated Feb. 17, 2016.

(Continued)

*Primary Examiner* — Hwei-Siu C Payer
(74) *Attorney, Agent, or Firm* — Burr & Forman LLP

(57) ABSTRACT

Herein a blade arrangement (6) for a hand-held power tool (2) is disclosed. The blade arrangement (6) comprises a driving member (16) configured for being driven to reciprocate along a driving direction (18), an elongated cutting blade body (12), and a clamping member (26). The clamping member (26) is configured to engage with the driving member (16) and the elongated cutting blade body (12) so as to press the driving member (16) against the elongated cutting blade body (12) at least partially in the driving direction (18).

12 Claims, 10 Drawing Sheets

(56) References Cited

U.S. PATENT DOCUMENTS

| | | | | |
|---|---|---|---|---|
| 5,640,837 A | * | 6/1997 | Ueyama | A01G 3/053 |
| | | | | 56/259 |
| 6,007,541 A | * | 12/1999 | Scott | A61B 17/144 |
| | | | | 30/369 |
| 6,263,579 B1 | | 7/2001 | Nagashima | |
| 8,028,423 B2 | | 10/2011 | Matsuo et al. | |
| 2003/0150120 A1 | * | 8/2003 | Hartmann | B23D 51/10 |
| | | | | 30/392 |
| 2014/0190023 A1 | * | 7/2014 | Vitantonio | B23D 51/16 |
| | | | | 30/369 |
| 2015/0150194 A1 | * | 6/2015 | Wang | A01G 3/053 |
| | | | | 30/216 |
| 2018/0359929 A1 | * | 12/2018 | Hansson | A01G 3/053 |

FOREIGN PATENT DOCUMENTS

| | | |
|---|---|---|
| EP | 2878191 A1 | 6/2015 |
| JP | H0645428 U | 6/1994 |
| JP | H08172838 A | 7/1996 |
| JP | H0928150 A | 2/1997 |
| WO | 2012121994 A1 | 9/2012 |

OTHER PUBLICATIONS

International Preliminary Report on Patentability for International Application No. PCT/EP2015/078027 dated Jun. 5, 2018.

* cited by examiner

BLADE ARRANGEMENT FOR HAND-HELD POWER TOOL AND CLAMPING MEMBER

TECHNICAL FIELD

The present invention relates to a blade arrangement for a hand-held power tool, to a hand-held power tool comprising a blade arrangement, and to a clamping member for a blade arrangement of a hand-held power tool.

BACKGROUND

Hand-held power tools wherein two cutting blade bodies abut against each other in a cutting plane are known in the art. A hedge trimmer is an example of such a hand-held power tool. Each cutting blade body comprise cutting teeth extending laterally in relation to a centreline of the cutting blade body. In operation of the hand-held power tool, the cutting blade bodies reciprocate in opposite directions such that interspaces between the cutting teeth of the two cutting blade bodies are alternately closed and opened. Thus, branches, sticks, grass, etc. are sheared off in the cutting plane between the cutting teeth.

The cutting teeth of the cutting blade bodies become blunt over time and may require re-sharpening or replacement. It is thus, desirable that the cutting blade bodies are easily dismountable from the hand-held power tool. Previously, part of a transmission configured to drive the cutting blade bodies required disassembly of as well as a cover of the hand-held power tool in order to dismount the cutting blade bodies from the hand-held power tool. More recently, separate driving members connected to the transmission have been suggested. Separate cutting blade bodies which are connected to the driving members extending outside the cover may be dismounted from the hand-held power tool without disassembling the transmission and/or the cover.

U.S. Pat. No. 6,263,579 discloses a hand-held power working machine in which the clipper blades thereof can be dismounted for the exchange or grinding thereof in a way that minimizes the possibility of damage to the power transmission device or the clipper blades in the course of such dismounting. The power working machine includes a working portion provided with a pair of clipper blades and a power transmission device for transmitting a reciprocating driving power to the working portion, wherein the power transmission device includes a pair of intermediate reciprocating driving plates which are couplingly interposed between a pair of reciprocating movement-guiding arms, to be driven by a driving rotor, and the pair of clipper blades.

U.S. Pat. No. 8,028,423 discloses a reciprocating-type cutting blade device having first and second driving bodies driven reciprocatingly in opposite directions. First and second cutting blade bodies are driven reciprocatingly by detachably engaging the first and second driving bodies. Two detachable guide plates slidably hold these driving and cutting blade bodies. A first boundary is formed between engaging portions of the first cutting blade body and the first driving body, and a second boundary is formed between engaging portions of the second cutting blade body and the second driving body. The boundaries intersect only at points in a planar view, and the engaging portions of the cutting blade bodies and the driving bodies maintain this state of intersection over a whole stroke of reciprocating motion.

U.S. Pat. No. 5,640,837 discloses a cutting section for a hedge trimmer. Such cutting section comprises a pair of elongate guide plates arranged at upper and lower positions respectively and secured at their rear ends on a transmission case of the trimmer, a pair of elongate cutter bars arranged one on top of another and received in a space formed between the pair of elongate guide plates, the rear end of each cutter bar being formed with a connecting portion projecting laterally and outwardly beyond the guide plates, and a pair of driving members arranged at upper and lower positions respectively. The elongated cutter bars are connected with the driving members. More specifically, each connecting portion of the elongate cutter bars is connected to an outer end of one of the driving members using at least one screw member. The screw member may comprise one or more bolts and optionally a bracket.

The reciprocating motion of the driving member and the thereto connected cutting blade body subjects the connection there between to high stress. Thus, the connection may become worn and/or may work loose.

SUMMARY

It is an object of the present invention to provide a blade arrangement for a hand-held power tool having a reliable connection between a driving member and a cutting blade body of the blade arrangement allowing an easy exchange of a worn cutting blade body.

According to an aspect of the invention, the object is achieved by a blade arrangement for a hand-held power tool. The blade arrangement comprises a driving member configured for being driven to reciprocate along a driving direction by a driving arrangement of the hand-held power tool, an elongated cutting blade body configured for being driven to reciprocate along the driving direction, and a clamping member. The clamping member connects the elongated cutting blade body to the driving member. The clamping member is configured to engage with the driving member and the elongated cutting blade body so as to press the driving member against the elongated cutting blade body at least partially in the driving direction.

Since the clamping member is configured to engage with the driving member and the elongated cutting blade body so as to press the driving member against the elongated cutting blade body at least partially in the driving direction, at least one force components of the clamping force/forces extend in parallel with the driving direction. Such a force distribution is advantageous for connecting two parts subjected to a reciprocating motion in the driving direction. As a result, the above mentioned object is achieved.

More specifically, it has been realised by the inventor that pressing the driving member against the elongated cutting blade body at least partially in the driving direction ensures that the driving member and the elongated cutting blade body are pressed against each other by at least one force component, which extends in parallel with the driving direction, i.e. which extends in parallel with the driving forces that the connection between the driving member and the elongated cutting blade body is subjected to. Such a parallel arrangement of forces is less likely to work loose than clamping forces extending orthogonally to the driving direction. In an arrangement having orthogonal clamping forces, such as disclosed e.g. in the above mentioned document U.S. Pat. No. 6,263,579, the reciprocating driving forces are only transferred via the frictional engagement, i.e. the frictional forces, between the driving member and the elongated cutting blade body. If in such an arrangement the clamping force is too low, or should become too low, the frictional forces will not suffice to transfer the driving force. Thus, the connection between the driving member and the elongated cutting blade body may rupture. In accordance with the present invention, wherein the clamping member is configured to engage with the driving member and the elongated cutting blade body so as to press the driving member against the elongated cutting blade body at least partially in the driving direction, a transfer of the driving force does not rely on the frictional forces between the driving member and the elongated cutting blade body. Thus, a secure engagement between the driving member and the elongated cutting blade body is provided. Also, a more robust and functional blade arrangement than in the above discussed prior art documents may be provided.

During the oscillating movement of a blade arrangement according to the present invention, the clamping force between the clamping member and the driving member and the elongate cutting blade body increases slightly as the blade assembly accelerates in a direction of the driving member. Conversely, the clamping force between the clamping member and the driving member and the elongate cutting blade body decreases slightly as the blade assembly accelerates in a direction of the elongated cutting blade body. Accordingly, the clamping force of the clamping member has to have at least one force component extending in parallel with the driving direction sufficiently large to ensure that the blade arrangement is securely connected also when the blade assembly accelerates in the direction of the elongated cutting blade body.

The hand-held power tool may be e.g. a hedge trimmer. The blade arrangement is configured for being reciprocated along the driving direction. The cutting blade body may comprise cutting teeth extending laterally in relation to the driving direction. The cutting blade body may be disconnected from the driving member by loosening, and/or removing, the clamping member. The clamping member as such may form a separate aspect of the present invention, see further below.

According to embodiments, the driving member may comprise a lateral member extending laterally in relation to the driving direction. The elongated cutting blade body may comprise a side member extending laterally in relation to the driving direction. The clamping member may engage the lateral member and the side member to press the driving member against the elongated cutting blade body. In this manner the clamping member may easily clamp the driving member to the elongated cutting blade body.

According to embodiments, the clamping member may comprises a screw member and a threaded portion. External threads of the screw member may engage with internal threads of the threaded portion. Tightening one of the screw member and the threaded portion may cause the clamping member to move the lateral member and the side member towards each other. In this manner at an operator may easily clamp the driving member to the elongated cutting blade body by tightening the screw member or the threaded portion.

According to embodiments, the clamping member may comprise opposing first and second inner surfaces arranged at an acute angle to each other. The lateral member may have a first outer surface arranged at an angle other than perpendicular to the driving direction. The side member may have a second outer surface arranged at an angle other than perpendicular to the driving direction. The first and second outer surfaces may face away from each other. The first outer surface may abut against the first inner surface and the second outer surface may abut against the second inner surface such that when the clamping member is moved in a direction perpendicular to the driving direction the first and second inner surfaces are pressed against the first and second outer surfaces to press the driving member against the elongated cutting blade body. In this manner an easily operable clamping member may be provided. Simply by moving the clamping member perpendicularly to the driving direction, a clamping force may be increased, or if moved to in an opposite direction, decreased. Moreover, by means of the clamping member and the arrangement of the inner and outer surfaces and alignment of the driving member and the elongated cutting blade body may be provided.

According to embodiments, the screw member or the threaded portion may abut against the lateral member and/or the side member such that a tightening of one of the screw member and the threaded portion causes a movement of the clamping member in the direction perpendicularly to the driving direction. In this manner only one of the screw member and the threaded portion may require manipulation in order to move the clamping member in the direction perpendicularly to the driving direction. Since one of the screw member and the threaded portion abuts against the lateral member and/or the side member, the manipulation of the other of the screw member and the threaded portion will cause the movement of the clamping member in the direction perpendicularly to the driving direction, and an engagement between the driving member and the elongated cutting blade body may be ensured.

According to embodiments, the threaded portion may be movable in relation to a body of the clamping member. The threaded portion may be arranged in a recess of the lateral member and/or the side member. A portion of the screw member may abut against the body of the clamping member such that when one of the screw member and the threaded portion is tightened the clamping member is forced towards the driving member and the elongated cutting blade body in the direction perpendicular to the driving direction. In this manner an operator, simply by tightening the screw member or the threaded portion, may manipulate the clamping member in order to clamp the driving member against the elongated cutting blade body. Moreover, by tightening the screw member or the threaded portion, a tension in the screw member may be transferred from the clamping member to the driving member and the elongate cutting blade body thus, providing opposing bending forces, which may ensure a secure engagement between the clamping member and the driving member and the elongate cutting blade body.

According to embodiments, the driving member and the elongated cutting blade body may be arranged in a keyed connection. In this manner the driving member and the elongated cutting blade body may be securely positioned in relation to each other prior to engaging the clamping member. Also, the keyed connection may ensure that the driving member and the elongated cutting blade body are properly aligned during engagement of the clamping member.

According to embodiments, a centreline extends through the driving member and the elongated cutting blade body in parallel with the driving direction. The keyed connection may comprise a first hook portion and second hook portion, the first hook portion forming part of the driving member and the second hook portion forming part of the elongated cutting blade body. The first and second hook portions may be arranged on an opposite side of the centreline to the lateral member and the side member. Since the first and second hook portions in such embodiments are arranged on an opposite side of the centreline to the lateral member and the side member and thus, on an opposite side of the centreline to the clamping member, only the one clamping member may be required to securely clamp the driving member to the elongated cutting blade body. More specifically, the clamping forces by the clamping member on one side of the centreline are opposed by abutment forces between the first and second hook portions on the opposite side of the centreline.

According to embodiments, a dividing line extends between the driving member and the elongated cutting blade body along the keyed connection. In an unclamped state there is a gap between the driving member and the elongated cutting blade body along a portion of the dividing line on a same side of the centreline as the lateral member and the side member, and wherein in the unclamped state on an opposite side of the centreline along a portion of the diving line the first and second hook portions abut against each other. In this manner, when the lateral member and the side member are pressed towards each other, in a clamped state, the gap is reduced or eliminated. Thus, portion of the elongated cutting blade body and the driving member are subjected to tensions, which ensure that the first and second hook portions will engage securely with each other. Accordingly, the clamping forces of the clamping member on one side of the centreline are countered by abutment forces between the first and second hook portions on the other side of the centreline.

It is a further object of the present invention to provide a clamping member for a blade arrangement for a hand-held power tool, which clamping member provides a reliable connection between a driving member and a cutting blade body of the blade arrangement.

According to an aspect of the invention, the object is achieved by a clamping member for a blade arrangement of a hand-held power tool, the blade arrangement comprising a driving member configured for being driven to reciprocate along a driving direction by a driving arrangement of the hand-held power tool, and an elongated cutting blade body configured for being driven to reciprocate along the driving direction. The clamping member is configured for connecting the elongated cutting blade body to the driving member. The clamping member is configured to engage with the driving member and the elongated cutting blade body so as to press the driving member against the elongated cutting blade body at least partially in the driving direction.

It a further object of the present invention to provide a hand-held power tool having a reliable connection between a driving member and a cutting blade body of a blade arrangement of the hand-held power tool.

According to an aspect of the invention, the object is achieved by a hand-held power tool comprising a driving arrangement and a pair of blade arrangements, each blade arrangement comprising a driving member and an elongated cutting blade body, wherein the elongated cutting blade bodies abut against each other in a cutting plane, characterised in that at least one blade arrangement of the pair of blade arrangements is a blade arrangement according to any one of aspects and/or embodiments disclosed herein.

As used herein the term hand-held power tool also encompasses power tools which may be supported by an operator in other ways than carrying the entire weight of the power tool with his or her hands, such as supporting the weight of the power tool on the shoulders or the back of the operator. The latter type of power tool is hand-held in the sense that it is guided by one or both hands of the operator. The hand-held power tool may be a hedge trimmer. Each cutting blade body may comprise cutting teeth extending laterally in relation to a centreline of the cutting blade body. In operation of the hand-held power tool, the cutting blade bodies reciprocate in opposite directions such that interspaces between the cutting teeth of the two cutting blade bodies are alternately closed and opened. At least one cutting blade body is dismountable from the hand-held power tool. The cutting blade bodies which are connected to the driving members may be dismounted from the hand-held power tool without disassembling the transmission.

The driving arrangement of the hand-power tool may comprise an internal combustion engine or an electric motor. Such an electric motor may be battery powered or alternatively, powered via a power cord connected to mains electricity.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
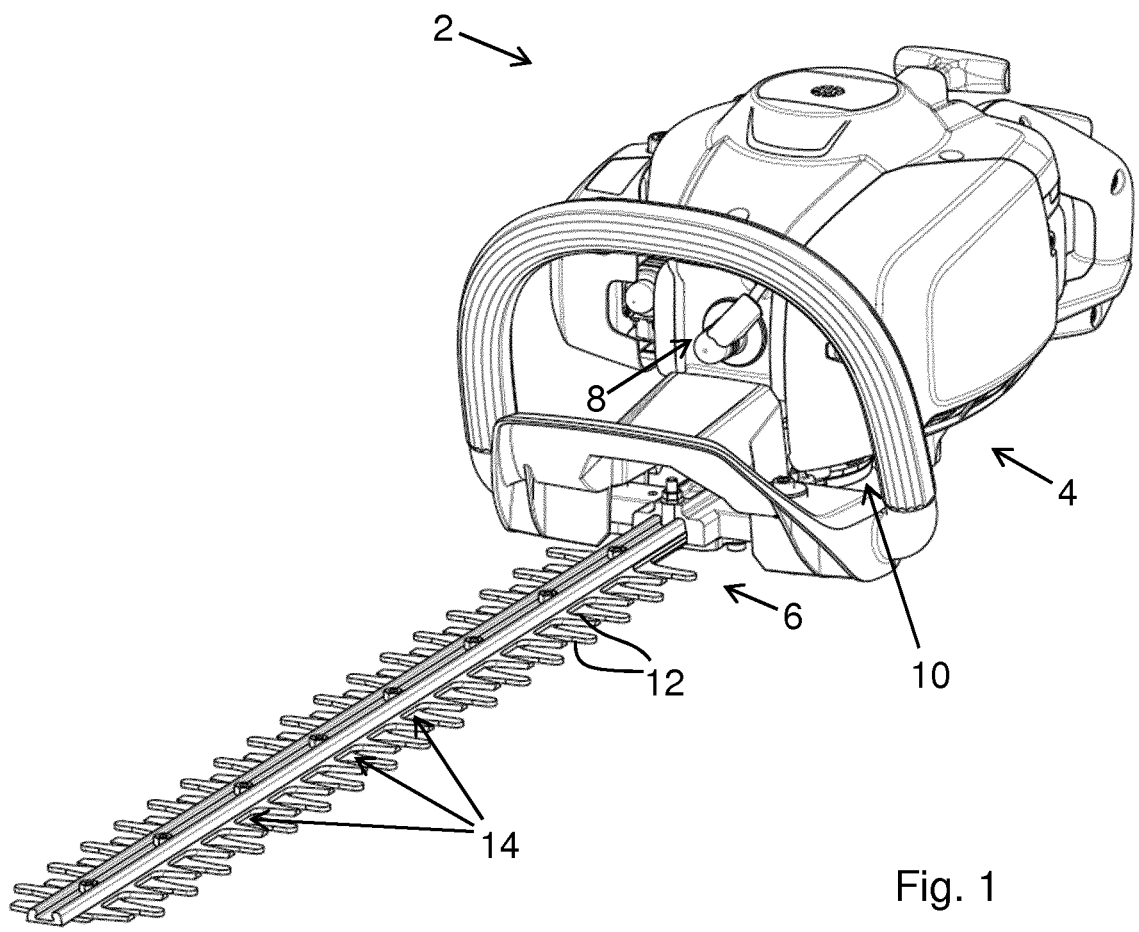
FIG. 1 illustrates a hand-held power tool according to embodiments.

FIG. 1 illustrates a hand-held power tool 2 according to embodiments. According to these embodiments the hand-held power tool is a hedge trimmer 2. However, according to alternative embodiments the hand-held power tool 2 may be any hand-held power tool comprising a pair of blade arrangements, of which at least one blade arrangement is a blade arrangement as discussed herein.

The hand-held power tool 2 comprises a driving arrangement 4 and a pair of blade arrangements 6. The driving arrangement 4 comprises for instance an internal combustion engine 8 and a transmission 10. The transmission 10 is configured for transforming a rotational motion caused by the internal combustion engine 8 into a linear reciprocating motion of each blade arrangement 6 of the pair of blade arrangements 6. Each blade arrangement 6 comprises a driving member and an elongated cutting blade body 12, wherein the elongated cutting blade bodies 12 abut against each other in a cutting plane 14.

During operation of the hand-held power tool 2, the elongated cutting blade bodies 12 reciprocate in opposite directions such that cutting teeth of the two elongated cutting blade bodies 12 perform shearing motions. The elongated cutting blade bodies 12 are dismountable from the hand-held power tool 2 without disassembling the transmission 10.

Each blade arrangement 6 of the pair of blade arrangements 6 may be a blade arrangement 6 according to any one of the blade arrangements 6 discussed in the following. The two blade arrangements 6 of a pair of blade arrangements 6 may be substantially identical. Alternatively, at least the two elongated cutting blade bodies 12 of a pair of blade arrangements 6 may be substantially identical.

Figures 2A, 2B, 2C:
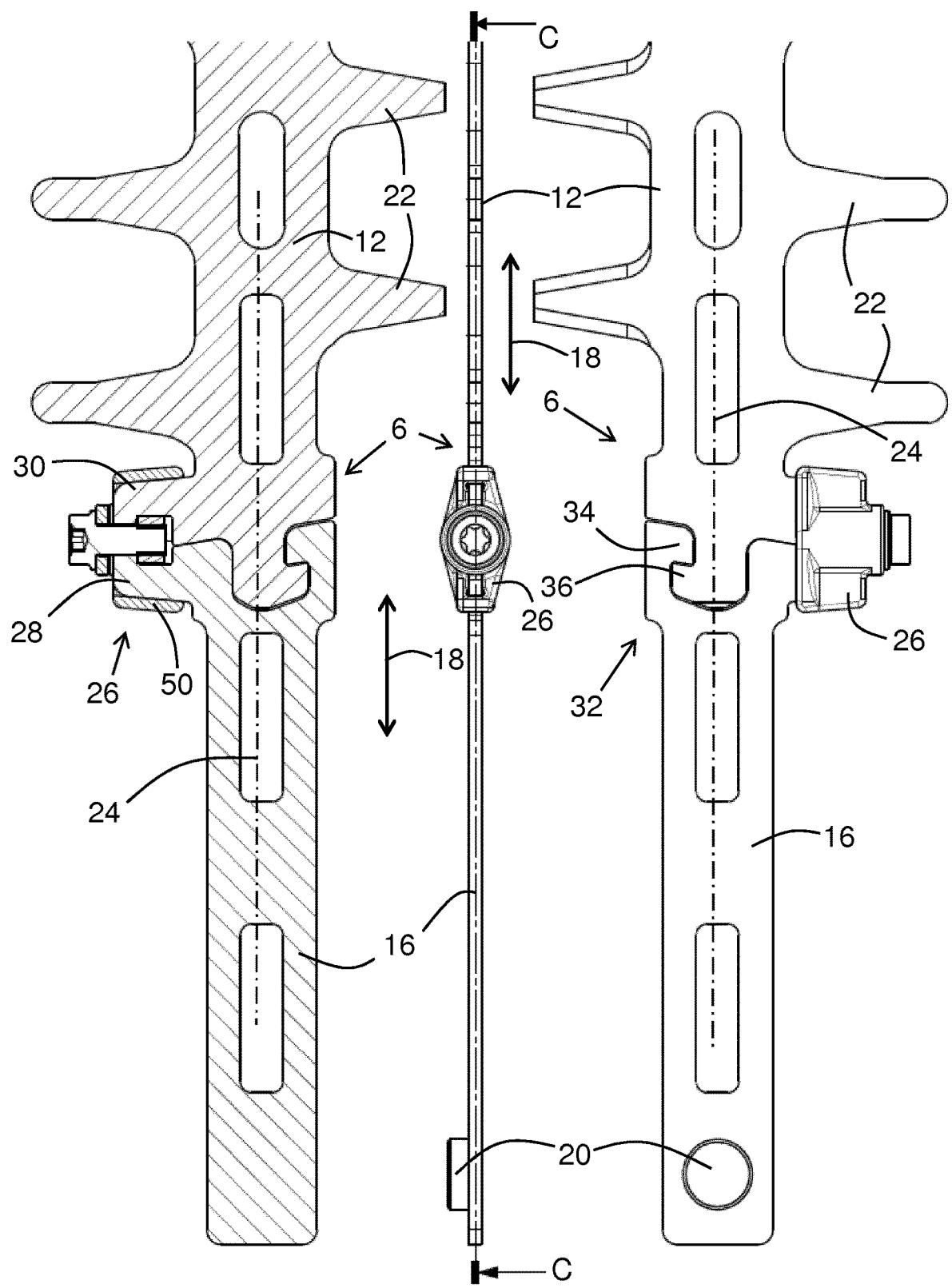
FIGS. 2A-2C illustrate embodiments of a blade arrangement for a hand-held power tool

FIGS. 2A-2C illustrate embodiments of a blade arrangement 6 for a hand-held power tool. FIG. 2A illustrates a top view, FIG. 2B illustrates a side view, and FIG. 2C illustrates a cross sectional view along line C-C in FIG. 2B of the blade arrangement 6.

The blade arrangement 6 comprises a driving member 16. The driving member 16 is configured for being driven to reciprocate along a driving direction 18 by a driving arrangement of the hand-held power tool. As mentioned above, the driving arrangement comprises a transmission configured for transforming a rotational movement caused by an engine, or a motor, to a linear reciprocating motion of the blade arrangement 6. The driving member 16 comprises at one end thereof a protrusion 20. The protrusion 20 forms part of, or is connected to, the transmission. The blade arrangement 6 further comprises an elongated cutting blade body 12 configured for being driven to reciprocate along the driving direction 18. The elongated cutting blade body 12 comprises cutting teeth 22 extending laterally in relation to a centreline 24 of the elongated cutting blade body 12 and the driving member 16. The centreline 24 extends in parallel with the driving direction 18. The blade arrangement 6 also comprises a clamping member 26.

The clamping member 26 connects the elongated cutting blade body 12 to the driving member 16. The clamping member 26 is configured to engage with the driving member 16 and the elongated cutting blade body 12 so as to press the driving member 16 against the elongated cutting blade body 12 at least partially in the driving direction 18. More specifically, the driving member 16 comprises a lateral member 28 extending laterally in relation to the driving direction 18. The elongated cutting blade body 12 comprises a side member 30 extending laterally in relation to the driving direction 18. The lateral member 28 and the side member 30 extend on the same side of the centreline 24. The clamping member 26 engages the lateral member 28 and the side member 30 to press the driving member 16 against the elongated cutting blade body 12.

Figure 6A:
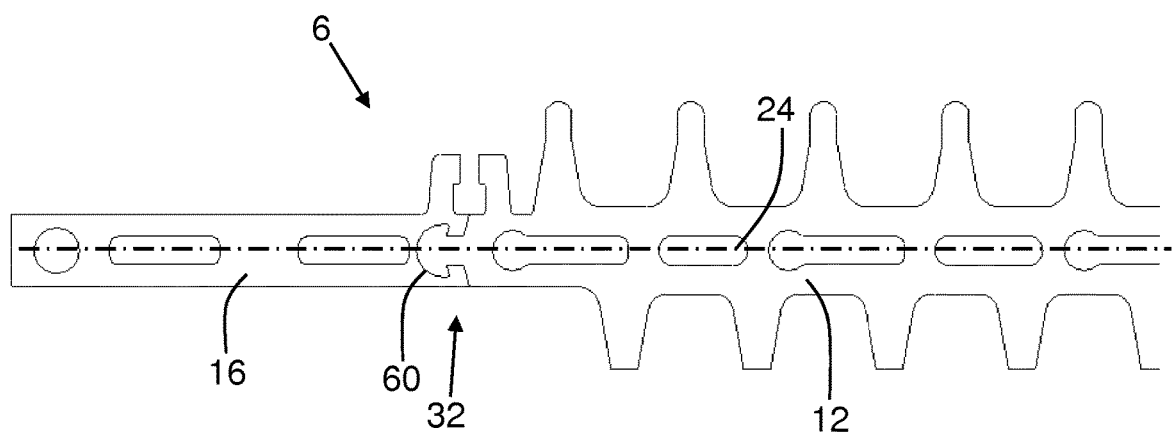
FIGS. 6A and 6B illustrate keyed connections according to alternative embodiments of blade arrangements.
Figure 6B:
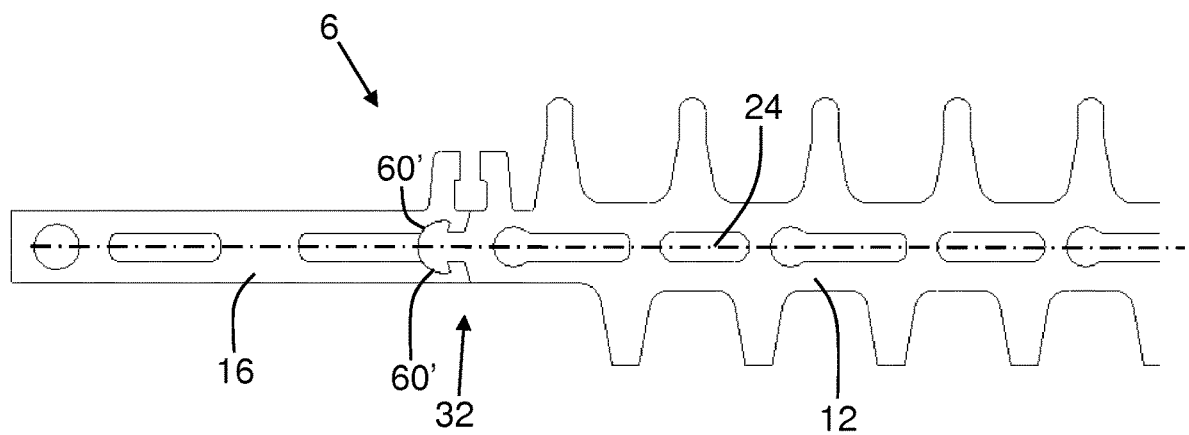

The driving member 16 and the elongated cutting blade body 12 are arranged in a keyed connection 32. The keyed connection 32 comprises a first hook portion 34 and second hook portion 36, or alternatively, any other kind or shape of inter-fitting geometrical configuration as also illustrated in FIGS. 6A, 6B and 7C. The first hook portion 34 forms part of the driving member 16 and the second hook portion 36 forms part of the elongated cutting blade body 12. The first and second hook portions 34, 36 engage with each other. When the clamping member 26 is removed the keyed connection at 32 may be released by moving the elongated cutting blade body 12 in a direction perpendicularly to the driving direction 18, i.e. perpendicularly to the plane of the drawing of FIG. 2A. Thus, the elongated cutting blade body 12 may be easily and quickly removed in one operational step from a relevant hand-held power tool, e.g. for sharpening or replacement, saving operator time.

Figure 3A:
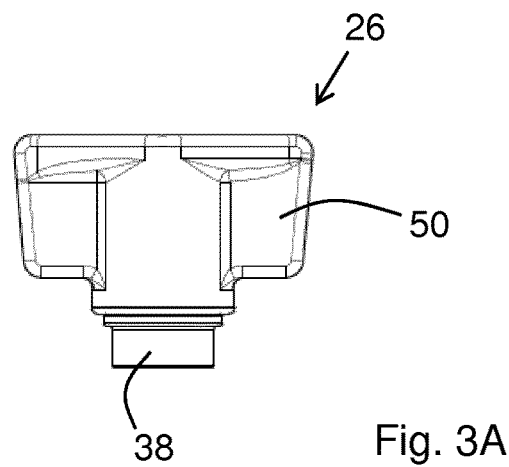
FIGS. 3A-3E illustrate various aspects of a clamping member.
Figure 3B:
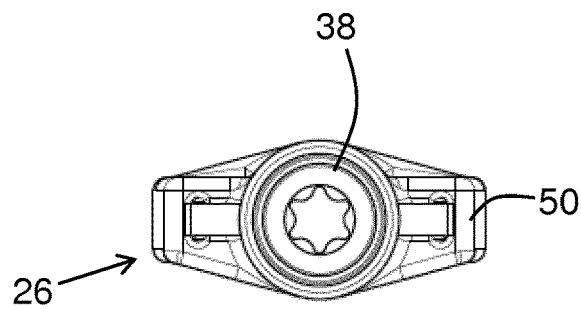
Figure 3C:
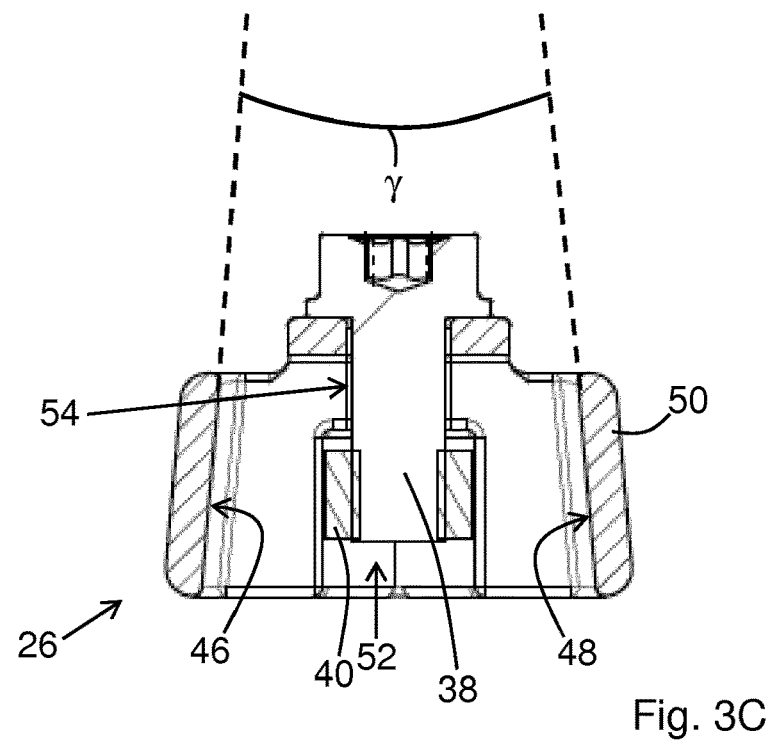
Figure 3D:
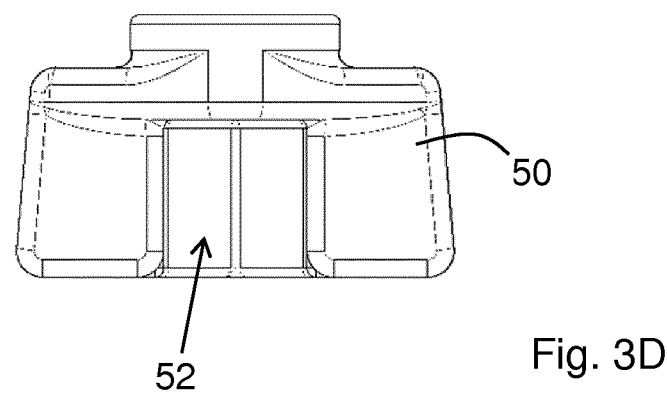
Figure 3E:
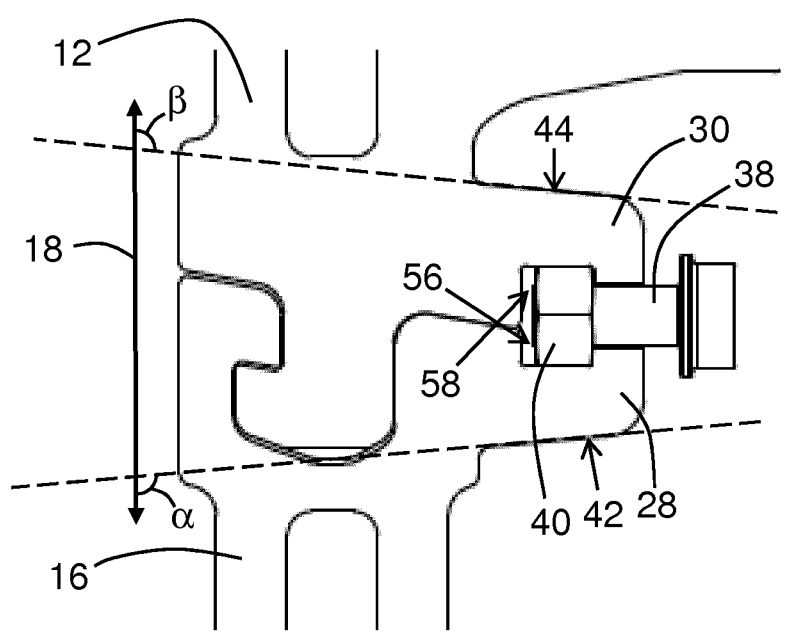

FIGS. 3A-3E illustrate various aspects of the clamping member 26 of FIGS. 2A-2C. FIG. 3A illustrates a top view of the clamping member 26, FIG. 3B illustrates a side view of the clamping member 26, FIG. 3C illustrates a cross sectional view of the clamping member 26, FIG. 3D illustrates a bottom view of a body 50 of the clamping member 26, and FIG. 3E illustrates a screw member 38 and a threaded portion 40 of the clamping member 26.

As mentioned above, the clamping member 26 is a member 26 for clamping a blade arrangement of a hand-held power tool, the blade arrangement comprising a driving member configured for being driven to reciprocate along a driving direction by a driving arrangement of the hand-held power tool, and an elongated cutting blade body configured for being driven to reciprocate along the driving direction. The clamping member 26 is configured for connecting the elongated cutting blade body to the driving member. The clamping member 26 is configured to engage with the driving member and the elongated cutting blade body so as to press the driving member against the elongated cutting blade body at least partially in the driving direction. Such a clamping member 26 may be provided as a separate item, e.g. as a spare part for a hand-held power tool, or the clamping member 26 may be provided together with a blade arrangement as discussed above in connection with FIGS. 2A-2C, or the clamping member 26 may be provided together with a hand-held power tool.

The clamping member 26 is configured to engage a lateral member of the driving member and a side member of the elongated cutting blade body to press the driving member against the elongated cutting blade body, see above in connection with FIGS. 2A-2C.

The clamping member 26 comprises a screw member 38 and a threaded portion 40. External threads of the screw member 38 engage with internal threads of the threaded portion 40. As will be discussed below, a tightening of one of the screw member 38 and the threaded portion 40 causes the clamping member 26 to move the lateral member and the side member towards each other.

The clamping member 26 further comprises a body 50. The body 50 of the clamping member 26 is provided with a recess 52, in which the threaded portion 40 is positioned above, see e.g. FIGS. 3C and 3D. The threaded portion 40 may for instance be a hexagonal nut. The hexagonal nut may be a locking nut, e.g. of the "Nyloc" type or similar, which may ensure that the threaded portion 40 is not loosened by vibrations in the blade arrangement. The threaded portion 40 is arranged in the recess 52 such that it is rotatably fixed but movable along at least part of the recess 52. The screw member 38 extends through a through hole 54 of the body 50 of the clamping member 26. The screw member 38 may for instance be a threaded bolt. Thus, when the screw member 38 is positioned in the through hole 54 and the threaded portion 40 is positioned in the recess 52, the external threads of the screw member 38 may be brought to engage with the internal threads of the threaded portion 40 by the operator turning the screw member 38. In this manner the threaded portion 40 may be displaced in relation to the body 50 of the clamping member 26.

With reference to FIGS. 2C, 3C, 3D, and 3E the interaction between the clamping member 26, the driving member 16, and the elongated cutting blade body 12 according to some embodiments will be discussed in the following. In particular, it will be discussed how the clamping member 26 engages with the driving member 16 and the elongated cutting blade body 12 so as to press the driving member 16 against the elongated cutting blade body 12 at least partially in the driving direction 18.

The lateral member 28 of the driving member 16 has a first outer surface 42 arranged at an angle $\alpha$ other than perpendicular to the driving direction 18, see FIG. 3E. The side member 30 has a second outer surface 44 arranged at an angle β other than perpendicular to the driving direction 18. Since the driving direction 18 and the centreline 24 are parallel to each other, the first outer surface 42 is arranged at the same angle α to the centreline 24, and the second outer surface 44 is arranged at the same angle α to the centreline 24. The first and second outer surfaces 42, 44 face away from each other.

The clamping member 26 comprises opposing first and second inner surfaces 46, 48 arranged at an acute angle γ to each other, see FIG. 3C. The first inner surface 46 is configured to abut against the first outer surface 42 of the lateral member 28. The second inner surface 48 is configured to abut against the second outer surface 44 of the side member 30 such that when the clamping member 26 is moved in a direction perpendicular to the driving direction 18, the first and second inner surfaces 46, 48 are pressed against the first and second outer surfaces 42, 44 to press the driving member 16 against the elongated cutting blade body 12, see FIG. 2C. More specifically, if the body 50 of the clamping member 26 is moved towards the centreline 24, forces pressing the driving member 16 against the elongated cutting blade body 12 are increased. Conversely, if the body 50 of the clamping member 26 is moved away from the centreline 24, forces pressing the driving member 16 against the elongated cutting blade body 12 are decreased.

As mentioned above, the clamping member 26 comprises a screw member 38 and a threaded portion 40. The threaded portion 40 is arranged in a recess 56 of the lateral member 28 and in a recess 58 of the side member 30. In the recesses 56, 58 the threaded portion 40 abuts against the lateral member 28 and the side member 30, see FIGS. 2C and 3E. An equal distance between abutment surfaces of the lateral member 28 and the side member 30 for the threaded portion 40 in the recesses 56, 58 may promote an even alignment of the driving member 16 and the elongate cutting blade body 12. The screw member 38 abuts with a portion thereof, e.g. its head, against the body 50 of the clamping member 26. As mentioned above, the threaded portion 40 is movable in relation to the body 50 of the clamping member 26. A tightening of the screw member 38 draws the screw member 38 together with the body 50 of the clamping member 26 towards the threaded portion 40. Since the threaded portion 40 abuts against the lateral member 28 and the side member 30 in the recesses 56, 58, a movement of the body 50 of the clamping member 26 in the direction perpendicularly to the driving direction 18, i.e. a movement to the right in FIG. 2C, is achieved. Thus, the clamping member 26 is moved towards the driving member 16 and the elongated cutting blade body 12 in the direction perpendicularly to the driving direction 18.

According to alternative embodiments, the screw member may abut against the lateral member and/or the side member such that a tightening of the threaded portion causes a movement of the clamping member in the direction perpendicularly to the driving direction. In such embodiments e.g. a hexagonal head of the screw member may be arranged in the recess 52 of the body 50 of the clamping member 26 and in a recess 56, 58 of the lateral member 28 and/or the side member 30. The threaded portion may abut against the body 50 of the clamping member 26. By tightening the threaded portion, the body 50 of the clamping member 26 is drawn in the direction perpendicularly to the driving direction 18.

Accordingly, the operator may fix the driving member 16 in relation to the elongated cutting blade body 12 by means of tightening the screw member 38 or the threaded portion 40 and thus, tightening the clamping member 26. Conversely, the operator may loosen the screw member 38 or the threaded portion 40 and thus, loosening the clamping member 26.

Once completely loosened, the clamping member 26 may be removed from the blade arrangement by removing the screw member 38 and the threaded portion 40 from the body 50 of the clamping member 26. Thus, also the body 50 of the clamping member 26 may be removed from the lateral member 28 and the side member 30. Thereafter the elongated cutting blade body 12 may be removed from the driving member 16 and the relevant hand-held power tool. The elongated cutting blade body 12 may be re-sharpened or replaced. The re-sharpened elongated cutting blade body 12, or a new one, is positioned such that the key connection 32 between the driving member 16 and the elongated cutting blade body 12 is engaged. Then the body 50 of the clamping member 26 is placed over the lateral member 28 and the side member 30, the threaded portion 40 and the screw member 38 are positioned in the body 50 of the clamping member 26, and by tightening the screw member 38 and/or the threaded portion 40 the clamping member 26 engages the lateral member 28 and the side member 30 to press the driving member 16 against the elongated cutting blade body 12.

Figure 4:
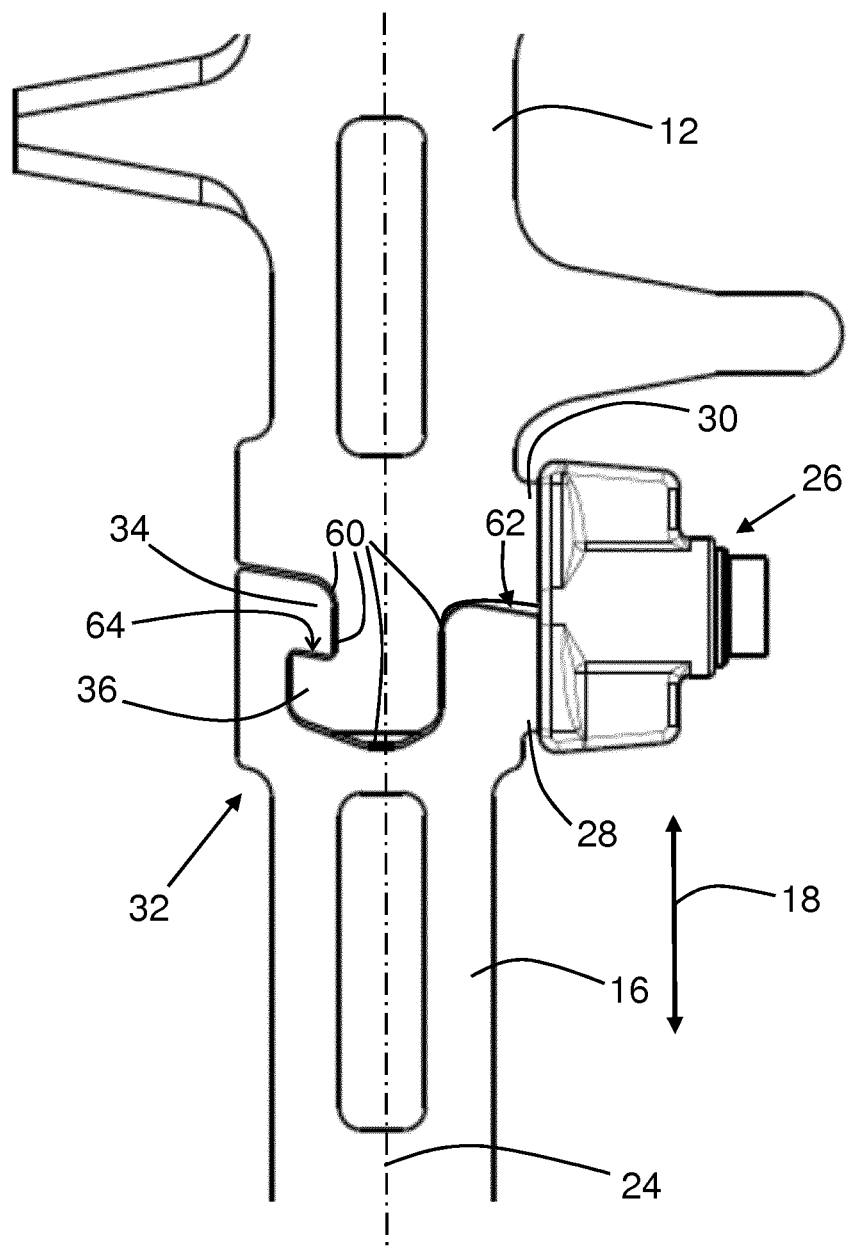
FIG. 4 illustrates a keyed connection of a blade arrangement in an unclamped state, FIGS. 5A and 5B schematically illustrate a force distribution within a blade arrangement.

FIG. 4 illustrates in detail the keyed connection 32 between the driving member 16 and the elongated cutting blade body 12 of the blade arrangement 6 of the embodiments illustrated in FIGS. 2A-2C in an unclamped state, i.e. with the clamping member 26 not tightened.

As mentioned above, the centreline 24 extends through the driving member 16 and the elongated cutting blade body 12 in parallel with the driving direction 18. The first and second hook portions 34, 36 are arranged on an opposite side of the centreline 24 to the lateral member and the side member. That is, on one side of the centreline 24 the first and second hook portions 34, 36 engages the driving member 16 with the elongated cutting blade body 12, and on the other side of the centreline 24 the clamping member 26 engages with the lateral member 28 and the side member 30.

A dividing line 60 extends between the driving member 16 and the elongated cutting blade body 12 along the keyed connection 32. In the unclamped state there is a gap 62 between the driving member 16 and the elongated cutting blade body 12 along a portion of the dividing 60 line on a same side of the centreline 24 as the lateral member 28 and the side member 30. Moreover, in the unclamped state, on an opposite side of the centreline 24 along a portion of the diving line 60 the first and second hook portions 34, 36 abut against each other. This is indicated at 64 in FIG. 4. In this manner it may be ensured that the first and second hook portions 34, 36 will abut against each other, on one side of the centreline 24 in order to counter the clamping forces of the clamping member 26 on the other side of the centreline 24. Accordingly, in a clamped state, the clamping forces of the clamping member 26 on one side of the centreline 24 are opposed by abutment forces between the first and second hook portions 34, 36 on the other side of the centreline 24.

Figure 5A:
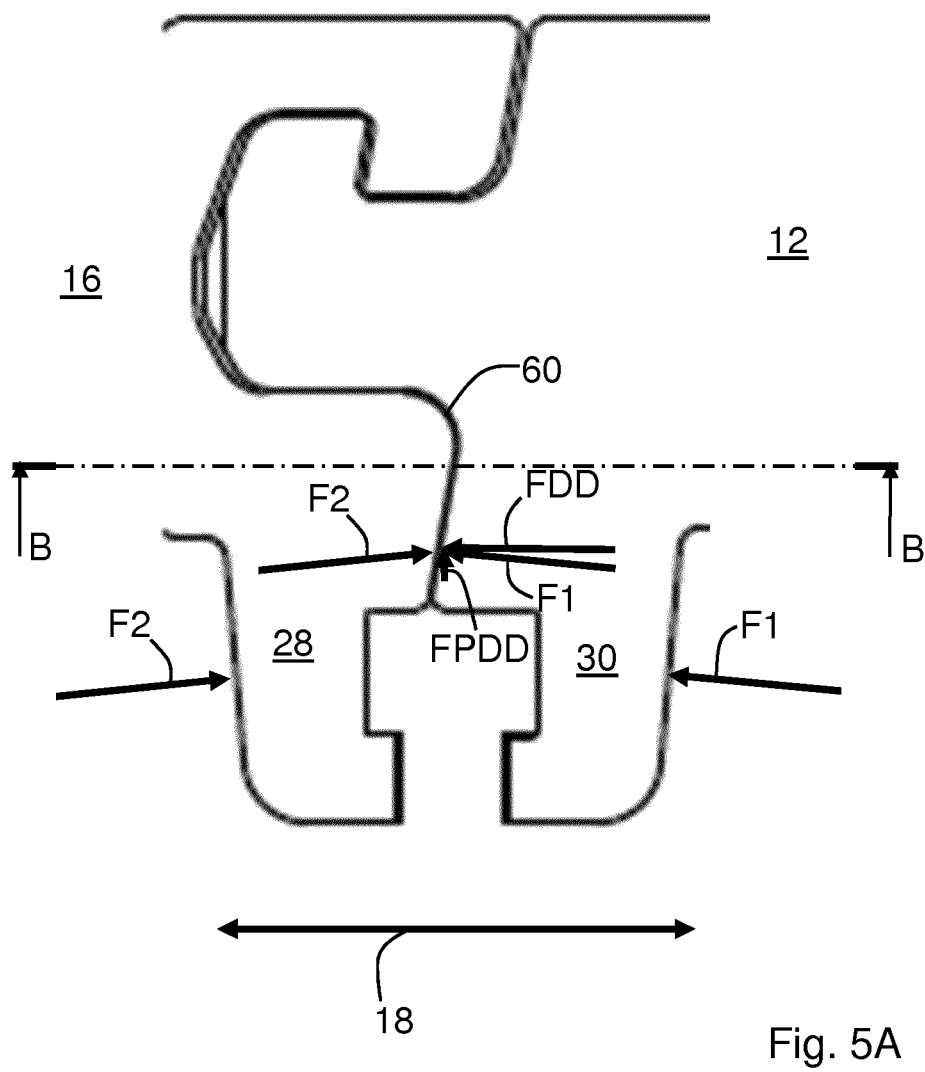
Figure 5B:
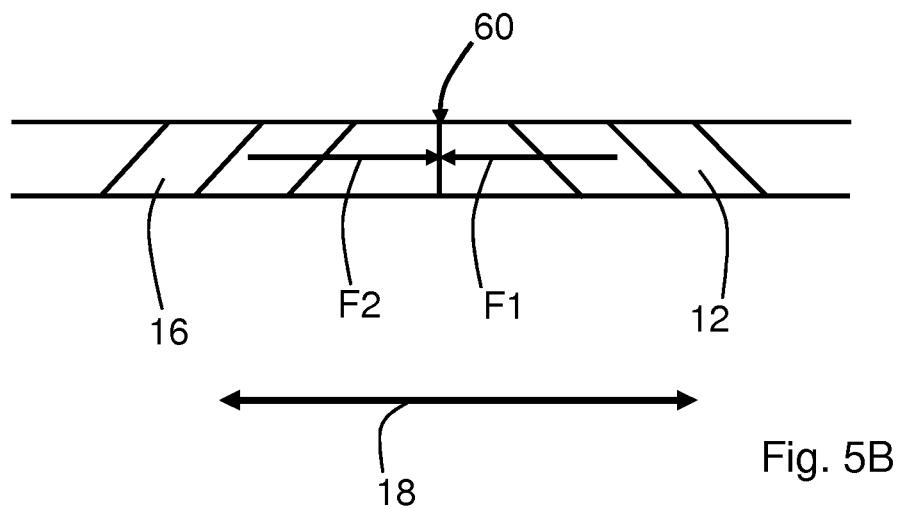

FIGS. 5A and 5B schematically illustrate a force distribution between the driving member 16 and the elongated cutting blade body 12 of a blade arrangement as discussed in connection with FIGS. 2A-2C and 4.

The clamping member being configured to engage with the driving member 16 and the elongated cutting blade body 12 so as to press the driving member 16 against the elongated cutting blade body 12 at least partially in the driving direction 18, entails that the clamping member is configured to engage with the driving member 16 and the elongated cutting blade body 12 to press the driving member 16 against the elongated cutting blade body 12 with at least one force having a force components extending in parallel with the driving direction 18.

More specifically, in FIG. 5A the clamping member has been omitted and only the clamping forces F1 and F2 from the clamping member acting on the outer surfaces 42, 44 of the lateral member 28 and the side member 30 have been shown. The clamping forces F1 and F2 are transferred to the driving member 16 and the elongated cutting blade body 12, and the abutment there between at the dividing line 60. For illustration purposes, the clamping force F1 has been divided into one force component FDD extending in parallel with the driving direction 18 and one force component FPDD extending perpendicularly to the driving direction 18. In FIG. 5B a cross section along line B-B in FIG. 5A is illustrated. As is clear from FIG. 5B, in the shown cross section the clamping forces F1 and F2 extend in parallel with the driving direction 18.

Along the dividing line 60 between the driving member 16 and the elongated cutting blade body 12, the driving member 16 and the elongated cutting body 12 may at least partly abut against each other along surfaces thereof extending substantially perpendicularly to the driving direction 18, see FIG. 5B. Thus, at least one force component of the clamping forces between the driving member 16 and the elongated cutting blade body 12 extends in parallel with the driving direction 18.

FIGS. 6A and 6B illustrate keyed connections 32 between driving members 16 and elongated cutting blade bodies 12 according to alternative embodiments of blade arrangements 6. In FIGS. 6A and 6B the clamping members of the blade arrangements 6 have been omitted. These embodiments resembled the previously discussed embodiments in much. Mainly the keyed connections 32 are differently shaped than in the previous embodiments. In the embodiments of FIGS. 6A and 6B the keyed connections 32 comprise hook portions on both sides of the centreline 24. In the embodiments of FIG. 6A a continuous dividing line 60 extends along the keyed connection 32. In the embodiments of FIG. 6B two dividing line portions 60' extend along the keyed connection 32.

Figures 7A, 7B:
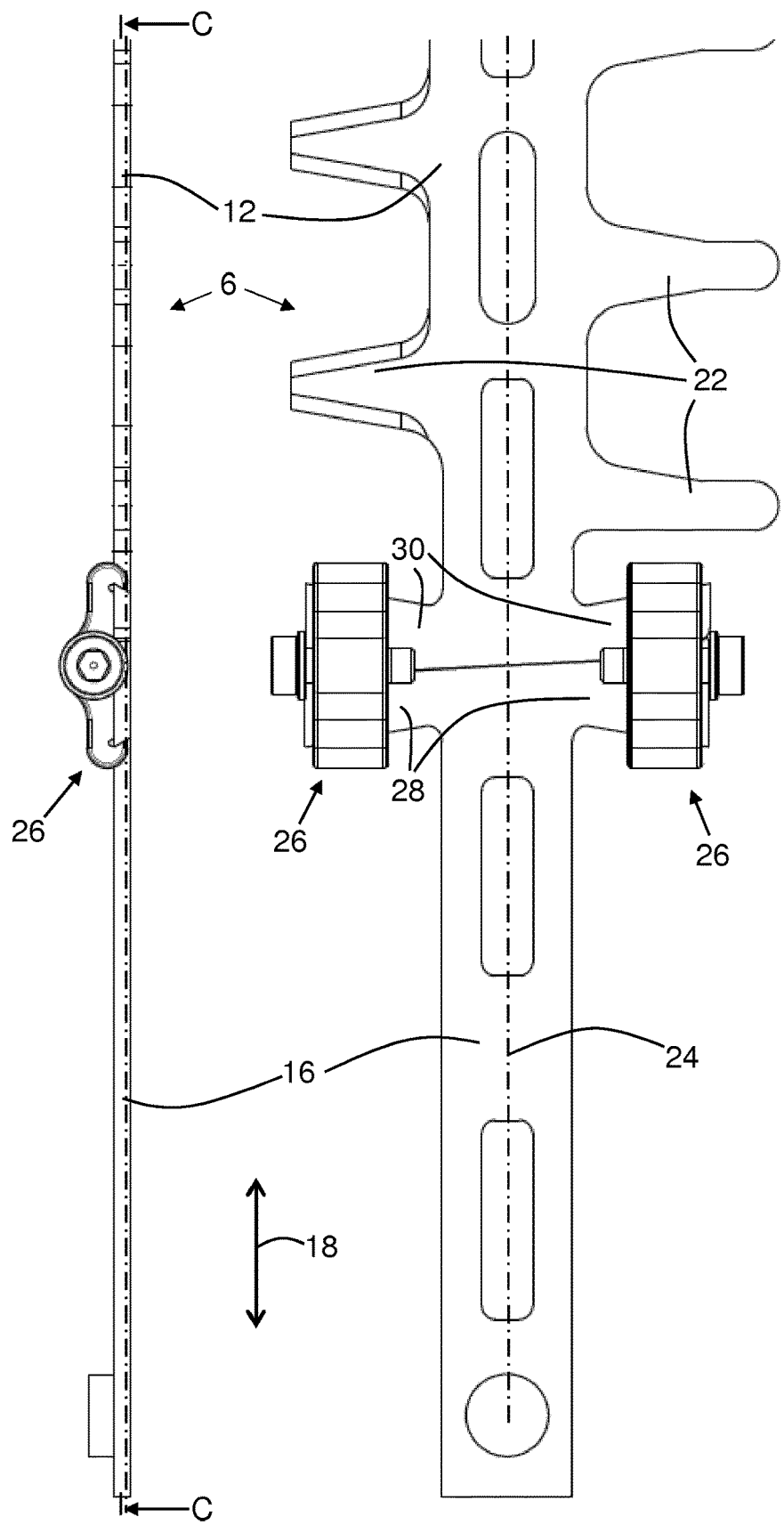
FIGS. 7A-7D illustrate alternative embodiments of a blade arrangement for a hand-held power tool.
Figures 7C, 7D:
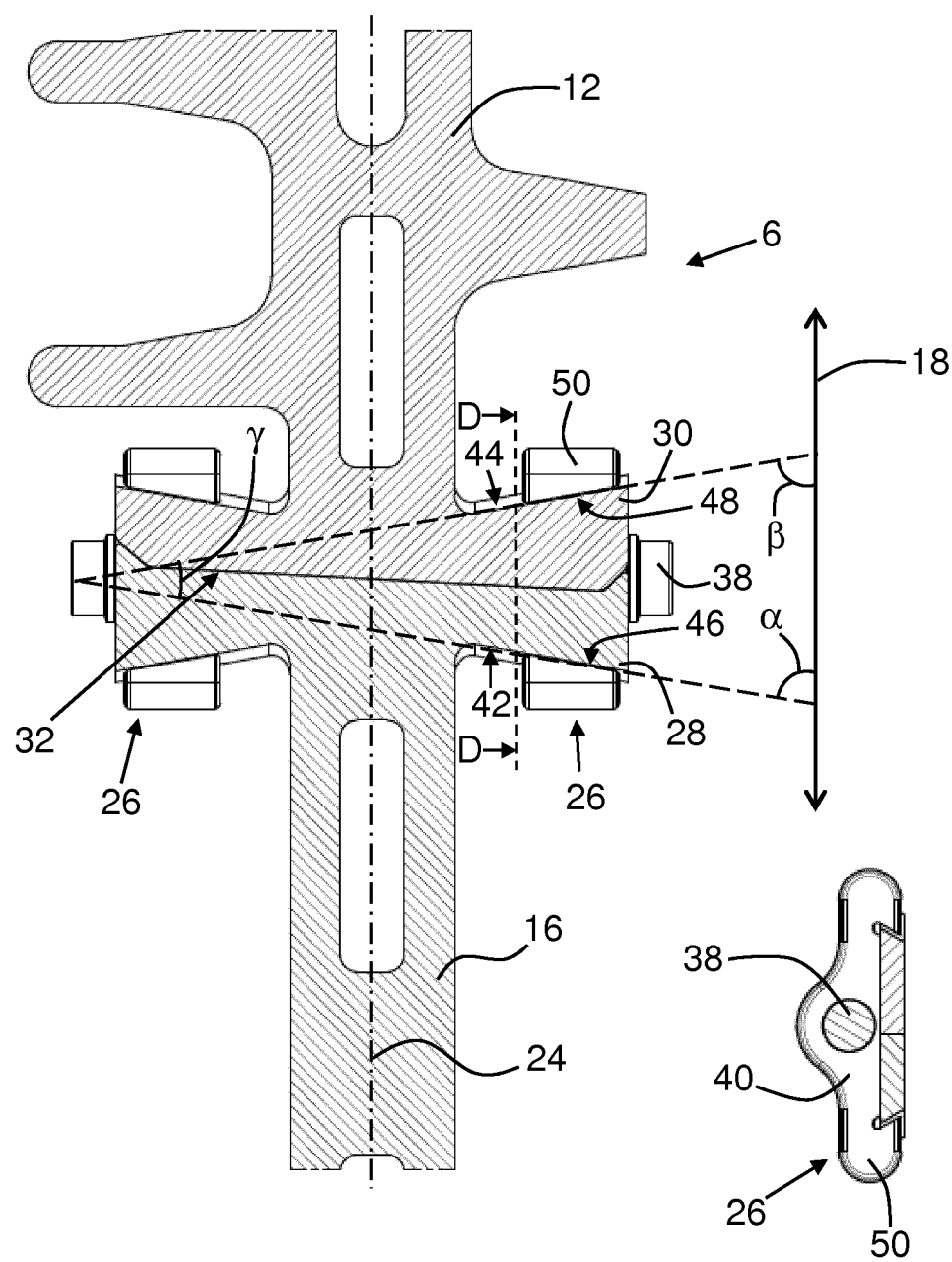

FIGS. 7A-7D illustrate alternative embodiments of a blade arrangement 6 for a hand-held power tool. FIG. 7A illustrates a top view, FIG. 7B illustrates a side view, FIG. 7C illustrates a cross sectional view along line C-C in FIG. 7B of the blade arrangement 6. FIG. 7D illustrates a side view of a clamping member 26 of the blade arrangement 6 along line D-D in FIG. 7C. In the following the main differences with the previous embodiments will be discussed.

Again the blade arrangement 6 comprises a driving member 16 and an elongated cutting blade body 12. The elongated cutting blade body 12 comprises cutting teeth 22. A centreline 24 extends in parallel with a driving direction 18 of the blade arrangement 6. The blade arrangement 6 also comprises two clamping members 26, one on each lateral side of the blade arrangement 6. The two clamping members 26 connect the elongated cutting blade body 12 to the driving member 16. Each of the clamping members 26 is configured to engage with the driving member 16 and the elongated cutting blade body 12 so as to press the driving member 16 against the elongated cutting blade body 12 at least partially in the driving direction 18.

In these embodiments, the driving member 16 comprises two lateral members 28 extending laterally in relation to the driving direction 18 on opposite sides of the centreline 24. The elongated cutting blade body 12 comprises two side members 30 extending laterally in relation to the driving direction 18 on opposite sides of the centreline 24. Each clamping member 26 engages one of the lateral members 28 and the side members 30 to press the driving member 16 against the elongated cutting blade body 12.

The driving member 16 and the elongated cutting blade body 12 are arranged in a keyed connection 32, see FIG. 7C. The keyed connection 32 comprises obliquely arranged linear sections. Thus, when abutting against each other the driving member 16 and the elongated cutting blade body 12 are centred in relation to each other about the centreline 24.

Accordingly, the driving member 16 and the elongated cutting blade body 12 are centred about the centreline 24 when the clamping members 26 are to be connected to the lateral members 28 and the side members 30.

Each of the clamping members 26, again, comprises a screw member 38 and a threaded portion 40, see FIG. 7D. External threads of the screw member 38 engage with internal threads of the threaded portion 40. The screw member 38 may for instance be a threaded bolt. A tightening of the screw member 38 will cause the clamping member 26 to move the lateral member 28 and the side member 30 towards each other.

With reference to FIGS. 7C and 7D the interaction between the clamping member 26, the driving member 16, and the elongated cutting blade body 12 according to these embodiments will be discussed in the following. In particular, it will be discussed how each of the clamping members 26 engages with the driving member 16 and the elongated cutting blade body 12 so as to press the driving member 16 against the elongated cutting blade body 12 at least partially in the driving direction 18.

Each lateral member 28 of the driving member 16 has a first outer surface 42 arranged at an angle $\alpha$ other than perpendicular to the driving direction 18, see FIG. 7C. Each side member 30 has a second outer surface 44 arranged at an angle $\beta$ other than perpendicular to the driving direction 18. Since the driving direction 18 and the centreline 24 are parallel to each other, the first outer surface 42 is arranged at the same angle $\alpha$ to the centreline 24, and the second outer surface 44 is arranged at the same angle $\beta$ to the centreline 24. The first and second outer surfaces 42, 44 face away from each other. Compared to the embodiments of FIGS. 2A-3E the first and second outer surfaces 42, 44 are angled in opposite directions in relation to the driving direction 18.

Each clamping member 26 comprises opposing first and second inner surfaces 46, 48 arranged at an acute angle $\gamma$ to each other, see FIG. 7C. The first inner surface 46 is configured to abut against the first outer surface 42 of the lateral member 28. The second inner surface 48 is configured to abut against the second outer surface 44 of the side member 30 such that when the clamping member 26 is moved in a direction perpendicular to the driving direction 18, the first and second inner surfaces 46, 48 are pressed against the first and second outer surfaces 42, 44 to press the driving member 16 against the elongated cutting blade body 12. More specifically, if a body 50 of the right hand clamping member 26 is moved to the right, and if a body of the left hand clamping member 26 is moved to the left i.e. the bodies of the clamping members 26 are moved away from the centreline 24, forces pressing the driving member 16 against the elongated cutting blade body 12 are increased. Conversely, if for each clamping member 26 the body 50 is moved towards the centreline 24, forces pressing the driving member 16 against the elongated cutting blade body 12 are decreased.

As mentioned above, each clamping member 26 comprises a screw member 38 and a threaded portion 40. In these embodiments, the threaded portion 40 forms an integral part of the body 50 of the clamping member 26. The screw member 38 is threaded into the threaded portion 40 and abuts with a portion thereof, e.g. its head, against the lateral and/or side member 28, 30. A tightening of the screw member 38 draws the body 50 of the clamping member 26 outwardly from the centreline 24. Due to the arrangement of the angled outer and inner surfaces 42, 44, 46, 48 a movement of the body 50 of the clamping member 26 in the direction perpendicularly to the driving direction 18, i.e. in these embodiments a movement away from the centreline 24, achieves a pressing of the driving member 16 against the elongated cutting blade body 12.

Accordingly, the operator may fix the driving member 16 in relation to the elongated cutting blade body 12 by means of tightening the screw member 38 and thus, tightening the clamping member 26. Conversely, the operator may loosen the screw member 38 and thus, loosening the clamping member 26.

Once the screw member 38 has been completely loosened, the clamping member 26 may be removed from the driving member 16 and the elongated cutting blade body 12 by moving the body 50 of the clamping member 26 towards the centreline 24. Thus, the body 50 of the clamping member 26 no longer engages with the first and second outer surfaces 42, 44 and may be removed from the lateral member 28 and the side member 30. A re-sharpened elongated cutting blade body 12, or a new one, is positioned such that the keyed connection 32 between the driving member 16 and the elongated cutting blade body 12 fits. Then the body 50 of the clamping member 26 is placed over the lateral member 28 and the side member 30, and the screw member 38 is tightened, the body 50 is moved towards the centreline 24 abutting against the lateral and/or side member 28, 30 so as to engage the lateral member 28 and the side member 30 pressing the driving member 16 against the elongated cutting blade body 12.

As in the previous embodiments, the clamping forces between the driving member 16 and the elongated cutting blade body 12 may be divided into force components extending in parallel with the driving direction 18 and perpendicularly to the driving direction 18 as discussed in connection with FIGS. 5A and 5B.

In these embodiments the bodies 50 of the clamping members 26 does not extend beyond the cutting plane formed between two abutting blade arrangements 6. Thus, the clamping members 26 of two cooperating blade arrangements 6 may be positioned at a same distance from the centreline 24 without interfering with each other during the reciprocating movements of the blade arrangements 6. In order to ensure that the body 50 of the clamping member 26 remains connected to the lateral and side members 28, 30, the first and second inner surfaces 46, 48 as well as the first and second outer surfaces 42, 44 are angled such that the lateral and side members 28, 30 are wedged towards the body 50 of the clamping member 26, see FIG. 7D.

Figure 8A:
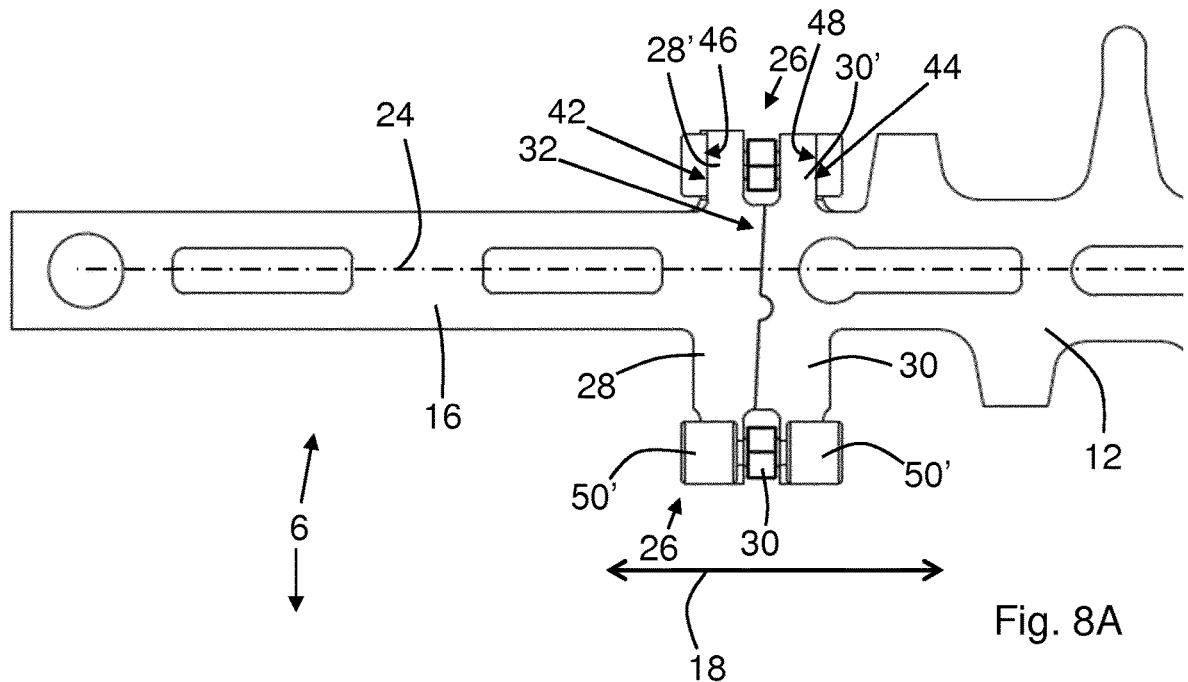
FIGS. 8A and 8B illustrate alternative embodiments of a blade arrangement for a hand-held power tool.
Figure 8B:
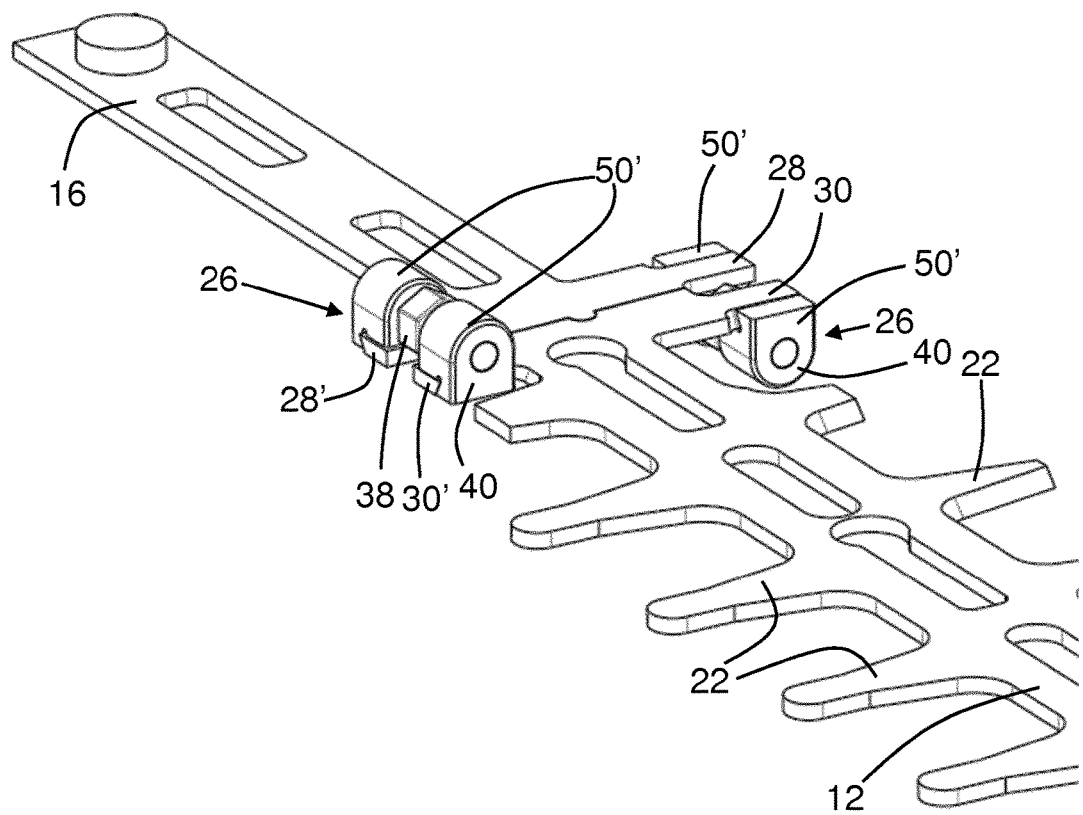

FIGS. 8A and 8B illustrate alternative embodiments of a blade arrangement 6 for a hand-held power tool such as a trimmer. FIG. 8A illustrates a top view and FIG. 8B illustrates a perspective view of the blade arrangement 6. In the following the main differences with the previous embodiments will be discussed.

Again, the blade arrangement 6 comprises a driving member 16 and an elongated cutting blade body 12. The elongated cutting blade body 12 comprises cutting teeth 22. A centreline 24 extends in parallel with a driving direction 18 of the blade arrangement 6. The blade arrangement 6 also comprises two clamping members 26, one on each lateral side of the blade arrangement 6. The two clamping members 26 connect the elongated cutting blade body 12 to the driving member 16. Each of the clamping members 26 is configured to engage with the driving member 16 and the elongated cutting blade body 12 so as to press the driving member 16 against the elongated cutting blade body 12 at least partially in the driving direction 18.

In these embodiments, the driving member 16 again comprises two lateral members 28, 28' extending laterally in relation to the driving direction 18 on opposite sides of the centreline 24. The elongated cutting blade body 12 comprises two side members 30, 30' extending laterally in relation to the driving direction 18 on opposite sides of the centreline 24. Each clamping member 26 engages one of the lateral members 28, 28' and the side members 30, 30' to press the driving member 16 against the elongated cutting blade body 12. One of the two lateral members 28, 28' is longer than the other, and one of the side members 30, 30' is longer than the other such that they extend at different lengths from the centreline 24.

The driving member 16 and the elongated cutting blade body 12 are arranged in a keyed connection 32. The keyed connection 32 comprises linear sections as well as a semicircular section. Thus, when abutting against each other, the driving member 16 and the elongated cutting blade body 12 are centred in relation to each other about the centreline 24. Accordingly, the driving member 16 and the elongated cutting blade body 12 are centred about the centreline 24 when the clamping members 26 are to be connected to the lateral members 28, 28' and the side members 30, 30'.

Each of the clamping members 26 comprises a screw member 38 and two threaded portions 40. The threaded portions 40 form part of body members 50' of the clamping member 26.

External threads of the screw member 38 engage with internal threads of the threaded portions 40. More specifically, the screw member 38 is provided with left-hand threads extending in one direction and right-hander threads extending in the opposite direction. One of the threaded portions 40 is provided with right-hand threads, and the other of the threaded portions 40 is provided with left-hand threads. A tightening of the screw member 38 will cause the clamping member 26 to move the lateral member 28 and the side member 30 towards each other.

The interaction between each of the clamping members 26, the driving member 16, and the elongated cutting blade body 12 according to these embodiments will be discussed in the following. In particular, it will be discussed how each of the clamping members 26 engage with the driving member 16 and the elongated cutting blade body 12 so as to press the driving member 16 against the elongated cutting blade body 12 at least partially in the driving direction 18.

In these embodiments the threaded member 38 of each clamping member 26 extends in parallel with the centreline 24 and the driving direction 18 of the blade arrangement 6. Due to the right-hand threads and the left-hand threads, turning of the threaded member will either pull the body members 50' of the clamping member 26 towards each other, or move them away from each other. Again, each lateral member 28, 28' of the driving member 16 has a first outer surface 42, and each side member 30, 30' has a second outer surface 44. The first and second outer surfaces 42, 44 face away from each other. Compared to the embodiments of FIGS. 2A-3E and 7A-7D, the first and second outer surfaces 42, 44 extend perpendicularly to the driving direction 18.

Each clamping member 26 comprises opposing first and second inner surfaces 46, 48. The first inner surface 46 is configured to abut against the first outer surface 42 of the lateral member 28. The second inner surface 48 is configured to abut against the second outer surface 44. As the screw member 38 is tightened, the first and second inner surfaces 46, 48 are pressed against the first and second outer surfaces 42, 44 to press the driving member 16 against the elongated cutting blade body 12. If the screw member 38 is loosened, forces pressing the driving member 16 against the elongated cutting blade body 12 are decreased.

Accordingly, the operator may fix the driving member 16 in relation to the elongated cutting blade body 12 by means of tightening the screw member 38 and thus, tightening the clamping member 26. Conversely, the operator may loosen the screw member 38 and thus, loosen the clamping member 26. Once the screw member 38 has been completely loosened, the clamping member 26 may be removed from the driving member 16 and the elongated cutting blade body 12.

The body members 50' of the clamping members 26 do not extend beyond the cutting plane formed between two abutting blade arrangements 6. In these embodiments the clamping members 26 face in opposite directions in relation to the cutting plane. Due to the different lengths of the lateral members 28, 28' and the side members 30, 30', the clamping members 26 of two cooperating blade arrangements 6 are positioned to not interfere with each other during the reciprocating movements of the blade arrangements 6. That is, on one side of the cutting plane, one clamping member 26 of each blade arrangement 6 of the two abutting blade arrangements 6 is arranged on one side of the centreline 24. On the other side of the cutting plane, one clamping member 26 of each blade arrangement 6 of the two abutting blade arrangements 6 is arranged on the other side of the centreline 24. In order to ensure that the body members 50' of the clamping member 26 remain connected to the lateral and side members 28, 28', 30, 30', the first and second inner surfaces 46, 48 as well as the first and second outer surfaces 42, 44 are angled such that the lateral and side members 28, 28', 30, 30' are wedged towards the body members 50' of the clamping member 26, see FIG. 8B the left clamping arrangement 26.

As in the previous embodiments, the clamping forces between the driving member 16 and the elongated cutting blade body 12 may be divided into force components extending in parallel with the driving direction 18 and perpendicularly to the driving direction 18 as discussed in connection with FIGS. 5A and 5B.

It is to be understood that the foregoing is illustrating various examples of different embodiments and not for a limitation of the scope of the intention that is defined by the appended claims. A person skilled in the art will realize that the example embodiments may be modified, and that different features of the example embodiments may be combined to create embodiments other than those described herein, without departing from the scope of the present invention, as defined by the appended claims.

The invention claimed is:

1. A blade arrangement for a hand-held power tool, the blade arrangement comprising:
 a driving member configured for being driven to reciprocate along a driving direction by a driving arrangement of the hand-held power tool,
 an elongated cutting blade body configured for being driven to reciprocate along the driving direction, and
 a clamping member, the clamping member connecting the elongated cutting blade body to the driving member,
 wherein the clamping member is configured to engage with the driving member and the elongated cutting blade body so as to press the driving member against the elongated cutting blade body at least partially in the driving direction,
 wherein the driving member comprises a lateral member extending laterally in relation to the driving direction,
 wherein the driving member comprises a lateral member extending laterally in relation to the driving direction,
 wherein the elongated cutting blade body comprises a side member extending laterally in relation to the driving direction, and
 wherein the clamping member engages the lateral member and the side member to press the driving member against the elongated cutting blade body.

2. The blade arrangement according to claim 1, wherein the clamping member comprises a screw member and a threaded portion,
 wherein external threads of the screw member engage with internal threads of the threaded portion, and
 wherein tightening one of the screw member and the threaded portion causes the clamping member to move the lateral member and the side member towards each other.

3. The blade arrangement according to claim 2, wherein the screw member or the threaded portion abuts against the lateral member or the side member such that a tightening of one of the screw member and the threaded portion causes a movement of the clamping member in the direction perpendicularly to the driving direction.

4. The blade arrangement according to claim 3, wherein the threaded portion is movable in relation to a body of the clamping member,
 wherein the threaded portion is arranged in a recess of the lateral member and/or the side member, and
 wherein a portion of the screw member abuts against the body of the clamping member such that when one of the screw member and the threaded portion is tightened, the clamping member is forced towards the driving member and the elongated cutting blade body in the direction perpendicularly to the driving direction.

5. The blade arrangement according to claim 1, wherein the clamping member comprises opposing first and second inner surfaces arranged at an acute angle to each other,
 wherein the lateral member has a first outer surface arranged at a first angle other than perpendicular to the driving direction,
 wherein the side member has a second outer surface arranged at a second angle other than perpendicular to the driving direction,
 wherein the first and second outer surfaces face away from each other, and
 wherein the first outer surface abuts against the first inner surface and the second outer surface abuts against the second inner surface such that when the clamping member is moved in a direction perpendicular to the driving direction the first and second inner surfaces are pressed against the first and second outer surfaces to press the driving member against the elongated cutting blade body.

6. The blade arrangement according to claim 1, wherein the driving member and the elongated cutting blade body are arranged in a keyed connection.

7. The blade arrangement according to claim 6, wherein a centreline extends through the driving member and the elongated cutting blade body in parallel with the driving direction, wherein the keyed connection comprises a first hook portion and a second hook portion, the first hook portion forming part of the driving member and the second hook portion forming part of the elongated cutting blade body, and wherein the first hook portion and the second hook portion are arranged on an opposite side of the centreline to the lateral member and the side member.

8. The blade arrangement according to claim 7, wherein a dividing line extends between the driving member and the elongated cutting blade body along the keyed connection, wherein in an unclamped state there is a gap between the driving member and the elongated cutting blade body along a portion of the dividing line on a same side of the centreline as the lateral member and the side member, and wherein in the unclamped state on an opposite side of the centreline along a portion of the diving line the first and second hook portions abut against each other.

9. A hand-held power tool comprising a driving arrangement and a pair of blade arrangements, each blade arrangement comprising a driving member and an elongated cutting blade body, wherein the elongated cutting blade bodies abut against each other in a cutting plane, characterised in that at least one blade arrangement of the pair of blade arrangements is a blade arrangement according to claim 1.

10. The hand-held power tool according to claim 9, wherein the hand-held power tool is a hedge trimmer.

11. A blade arrangement of a hand-held power tool, the blade arrangement comprising:

a driving member configured for being driven to reciprocate along a driving direction by a driving arrangement of the hand-held power tool, an elongated cutting blade body configured for being driven to reciprocate along the driving direction, a clamping member configured for connecting the elongated cutting blade body to the driving member, wherein the clamping member is configured to engage with the driving member and the elongated cutting blade body so as to press the driving member against the elongated cutting blade body at least partially in the driving direction, wherein the clamping member is configured to engage a lateral member of the driving member and a side member of the elongated cutting blade body to press the driving member against the elongated cutting blade body;

wherein the clamping member further comprises a screw member and a threaded portion, wherein external threads of the screw member engage with internal threads of the threaded portion, and wherein tightening one of the screw member and the threaded portion causes the clamping member to move the lateral member and the side member towards each other.

12. A blade arrangement of a hand-held power tool, the blade arrangement comprising:

a driving member configured for being driven to reciprocate along a driving direction by a driving arrangement of the hand-held power tool, an elongated cutting blade body configured for being driven to reciprocate along the driving direction, and a clamping member configured for connecting the elongated cutting blade body to the driving member, wherein the clamping member is configured to engage with the driving member and the elongated cutting blade body so as to press the driving member against the elongated cutting blade body at least partially in the driving direction, wherein the clamping member is configured to engage a lateral member of the driving member and a side member of the elongated cutting blade body to press the driving member against the elongated cutting blade body, wherein the clamping member further comprises opposing first and second inner surfaces arranged at an acute angle to each other, wherein the first inner surface is configured to abut against a first outer surface of the lateral member, and wherein the second inner surface is configured to abut against a second outer surface of the side member such that when the clamping member is moved in a direction perpendicular to the driving direction the first and second inner surfaces are pressed against the first and second outer surfaces to press the driving member against the elongated cutting blade body.

* * * * *